(12) United States Patent
Wang

(10) Patent No.: US 11,697,470 B1
(45) Date of Patent: Jul. 11, 2023

(54) DUAL-PURPOSE ELECTRIC SCOOTER

(71) Applicant: Shenzhen Xincheng Times Technology Co., Ltd, Shenzhen (CN)

(72) Inventor: Huizhong Wang, Shenzhen (CN)

( * ) Notice: Subject to any disclaimer, the term of this patent is extended or adjusted under 35 U.S.C. 154(b) by 0 days.

(21) Appl. No.: 18/075,602

(22) Filed: Dec. 6, 2022

(30) Foreign Application Priority Data

Dec. 5, 2022 (EP) ..................................... 22211311

(51) Int. Cl.
*B62K 3/00* (2006.01)
*B62J 43/10* (2020.01)
*B62J 45/00* (2020.01)
*B62K 21/12* (2006.01)

(52) U.S. Cl.
CPC ............... *B62K 3/002* (2013.01); *B62J 43/10* (2020.02); *B62J 45/00* (2020.02); *B62K 21/12* (2013.01); *B62K 2202/00* (2013.01)

(58) Field of Classification Search
CPC .... B62K 3/002; B62K 21/12; B62K 2202/00; B62J 43/10; B62J 45/00
See application file for complete search history.

(56) References Cited

U.S. PATENT DOCUMENTS

| | | | | |
|---|---|---|---|---|
| 7,293,622 B1* | 11/2007 | Spital | ..................... | A63C 17/12 |
| | | | | 180/181 |
| 9,592,876 B2* | 3/2017 | Lovley, II | ................ | B62K 5/05 |
| 9,638,285 B2* | 5/2017 | Huang | ................. | B60K 17/145 |
| 9,660,500 B2* | 5/2017 | Huang | .................... | B62K 9/00 |
| 9,770,080 B2* | 9/2017 | Dourado | .................... | A45F 3/04 |
| 11,254,387 B2* | 2/2022 | Hopkins | .................. | B62K 5/06 |
| 11,338,806 B2* | 5/2022 | Hong | ................... | G05D 1/0088 |
| 2010/0013183 A1* | 1/2010 | He | ......................... | B62K 3/002 |
| | | | | 280/124.1 |
| 2021/0070294 A1* | 3/2021 | Hong | ..................... | B62K 3/002 |
| 2021/0165404 A1* | 6/2021 | Gillett | ................. | B60W 60/005 |
| 2021/0380180 A1* | 12/2021 | Garcia Henarejos | .... | B62J 11/19 |
| 2022/0194455 A1* | 6/2022 | Shimotani | ............ | B62B 5/0026 |
| 2023/0031917 A1* | 2/2023 | Dray | ..................... | B62K 25/04 |

* cited by examiner

*Primary Examiner* — Kevin Hurley
*Assistant Examiner* — Marlon A Arce

(57) ABSTRACT

The present disclosure relates to a dual-purpose electric scooter. The dual-purpose electric scooter includes a deck assembly, a handlebar assembly detachably connected with the deck assembly, two front wheels installed on a bottom side of the deck assembly, and a back wheel installed on the bottom side of the deck assembly. The back wheel is a motor integrated wheel and configured to drive the electric scooter move.

19 Claims, 7 Drawing Sheets

DUAL-PURPOSE ELECTRIC SCOOTER

TECHNICAL FIELD

The present disclosure relates to the field of scooters, in particular to a dual-purpose electric scooter.

BACKGROUND

Scooter is a fashionable sports leisure tool, which is popular among children. However, as for a traditional scooter, children can only hold a handle of the scooter and ride it in a foot-driving mode, it is hard to get good user experience.

SUMMARY

The present disclosure provides a dual-purpose electric scooter.

The present disclosure adopts the following technical solution: a dual-purpose electric scooter including a deck assembly; a handlebar assembly detachably connected with the deck assembly; two front wheels installed on a bottom side of the deck assembly; and a back wheel installed on the bottom side of the deck assembly, and the back wheel being a motor integrated wheel and configured to drive the electric scooter move.

Further, the deck assembly comprises a first mounting portion and a first fastener located at a side wall of the first mounting portion, the handlebar assembly comprises a handle, an upright rod and second fastener, an end of the upright rod is connected with the handle, the second fastener is disposed at the other end of the upright rod, when the other end of the upright rod is disposed in the first mounting portion and the first fastener is fixed with the second fastener, the handlebar assembly is connected with the deck assembly, when the first fastener and the second fastener separate from each other, the other end of the upright rod is able to be separated from the deck assembly.

Further, the first fastener is a first notch located at the side wall of the first mounting portion, the second fastener comprises a first elastic portion located in the other end of the upright rod and a first protrusion connected with the first elastic portion, when the first protrusion is pressed by a first external force, the first elastic portion is compressed to pull the first protrusion into the upright rod and separate from the first notch, when the first external force is removed, a first elastic force released by the first elastic portion drives the first protrusion protrude from the upright rod so as to fix into the first notch.

Further, the second fastener comprises a second elastic portion located in the other end of the upright rod and a second protrusion connected with the second elastic portion, the second protrusion is configured to abuts against the side wall of the first mounting portion.

Further, the first elastic portion comprises a first V-shaped structure and a first extending part connected with an end of the first V-shaped structure, the first protrusion is disposed on the first extending part, the second elastic portion comprises a second V-shaped structure and a second extending part connected with an end of the second V-shaped structure, a first opening of the first V-shaped structure and a second opening of the second V-shaped structure are towards to a bottom side of the deck assembly, the second V-shaped structure is located at an upper side of the first V-shaped structure and abuts the first V-shaped structure, the second protrusion is disposed on the second extending part.

Further, the handlebar assembly comprises a fixing cover located at a bottom side of the second fastener and fixed on the other end of the upright rod, the fixing cover comprises a cover body and a side plate connected with the cover body, the side plate abuts an outer surface of the other end of the upright rod and comprises a second notch, and the first protrusion passes through the second notch.

Further, the dual-purpose electric scooter comprises a cover plate configured to detachably connect with the deck assembly and cover the first mounting portion when the handlebar assembly separate from the deck assembly.

Further, the deck assembly comprises an upper shell and an bottom shell connected with the upper shell, the dual-purpose electric scooter comprises a battery located between the upper shell and the bottom shell and supplies the motor integrated wheel.

Further, the dual-purpose electric scooter comprises a first switch element and a control circuit board, the control circuit board is electrically connected with the first switch element, the battery and the motor integrated wheel, the first switch element comprises a first pedal mounted on the upper shell and a first trigger portion disposed on the control circuit board, when the first pedal is stamped by a foot, the first trigger portion is triggered and generates a first switch signal, and the control circuit board controls the motor integrated wheel rotate according to the first switch signal.

Further, the upper shell comprises a second mounting portion located at a back side of the handlebar assembly and adjacent to the handlebar assembly, the first pedal is installed in the second mounting portion.

Further, the dual-purpose electric scooter comprises a second switch element electrically connected with the control circuit board, the second switch element comprises a second pedal mounted on the upper shell and a brake element electrically connected with the control circuit board, when the second pedal is stamped by a foot, the brake element is triggered and generates a second switch signal, and the control circuit board controls the motor integrated wheel stop rotating according to the second switch signal.

Further, the upper shell comprises a third mounting portion located at the an end far away from the handlebar assembly and adjacent to the back wheel, the second pedal is installed in the third mounting portion.

The present disclosure adopts the following technical solution: a dual-purpose electric scooter comprising a deck assembly; a handlebar assembly detachably connected with the deck assembly; and at least three wheels installed on a bottom side of the deck assembly, one of the at least two wheels being a motor integrated wheel and configured to drive the electric scooter move.

Further, the deck assembly comprises a first mounting portion and a first fastener located at a side wall of the first mounting portion, the handlebar assembly comprises a handle, an upright rod and second fastener, an end of the upright rod is connected with the handle, the second fastener is disposed at the other end of the upright rod, when the other end of the upright rod is disposed in the first mounting portion and the first fastener is fixed with the second fastener, the handlebar assembly is connected with the deck assembly, when the first fastener and the second fastener separate from each other, the other end of the upright rod is able to be separated from the deck assembly.

Further, the first fastener is a first notch located at the side wall of the first mounting portion, the second fastener comprises a first elastic portion located in the other end of the upright rod and a first protrusion connected with the first elastic portion, when the first protrusion is pressed by a first external force, the first elastic portion is compressed to pull the first protrusion into the upright rod and separate from the first notch, when the first external force is removed, a first elastic force released by the first elastic portion drives the first protrusion protrude from the upright rod so as to fix into the first notch.

Further, the second fastener comprises a second elastic portion located in the other end of the upright rod and a second protrusion connected with the second elastic portion, the second protrusion is configured to abuts against the side wall of the first mounting portion.

Further, the first elastic portion comprises a first V-shaped structure and a first extending part connected with an end of the first V-shaped structure, the first protrusion is disposed on the first extending part, the second elastic portion comprises a second V-shaped structure and a second extending part connected with an end of the second V-shaped structure, a first opening of the first V-shaped structure and a second opening of the second V-shaped structure are towards to a bottom side of the deck assembly, the second V-shaped structure is located at an upper side of the first V-shaped structure and abuts the first V-shaped structure, the second protrusion is disposed on the second extending part, the handlebar assembly comprises a fixing cover located at a bottom side of the second fastener and fixed on the other end of the upright rod, the fixing cover comprises a cover body and a side plate connected with the cover body, the side plate abuts an outer surface of the other end of the upright rod and comprises a second notch, and the first protrusion passes through the second notch.

Further, the dual-purpose electric scooter comprises a cover plate configured to detachably connect with the deck assembly and cover the first mounting portion when the handlebar assembly separate from the deck assembly.

Further, the deck assembly comprises an upper shell and an bottom shell connected with the upper shell, the dual-purpose electric scooter comprises a battery located between the upper shell and the bottom shell and supplies the motor integrated wheel, the dual-purpose electric scooter comprises a first switch element and a control circuit board, the control circuit board is electrically connected with the first switch element, the battery and the motor integrated wheel, the first switch element comprises a first pedal mounted on the upper shell and a first trigger portion disposed on the control circuit board, when the first pedal is stamped by a foot, the first trigger portion is triggered and generates a first switch signal, and the control circuit board controls the motor integrated wheel rotate according to the first switch signal Further, the dual-purpose electric scooter comprises a second switch element electrically connected with the control circuit board, the second switch element comprises a second pedal mounted on the upper shell and a brake element electrically connected with the control circuit board, when the second pedal is stamped by a foot, the brake element is triggered and generates a second switch signal, and the control circuit board controls the motor integrated wheel stop rotating according to the second switch signal.

The present disclosure has the beneficial effects: when the other end of the upright rod is disposed in the first mounting portion and the first fastener is fixed with the second fastener, the handlebar assembly is connected with the deck assembly, and a user can hold a handlebar assembly of the scooter and ride the scooter in a foot-driving mode. When the first fastener and the second fastener separate from each other, the other end of the upright rod is able to be separated from the deck assembly, and the user can ride the scooter in an electric mode. The scooter can be ridden in the two modes and the user can get good user experience.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
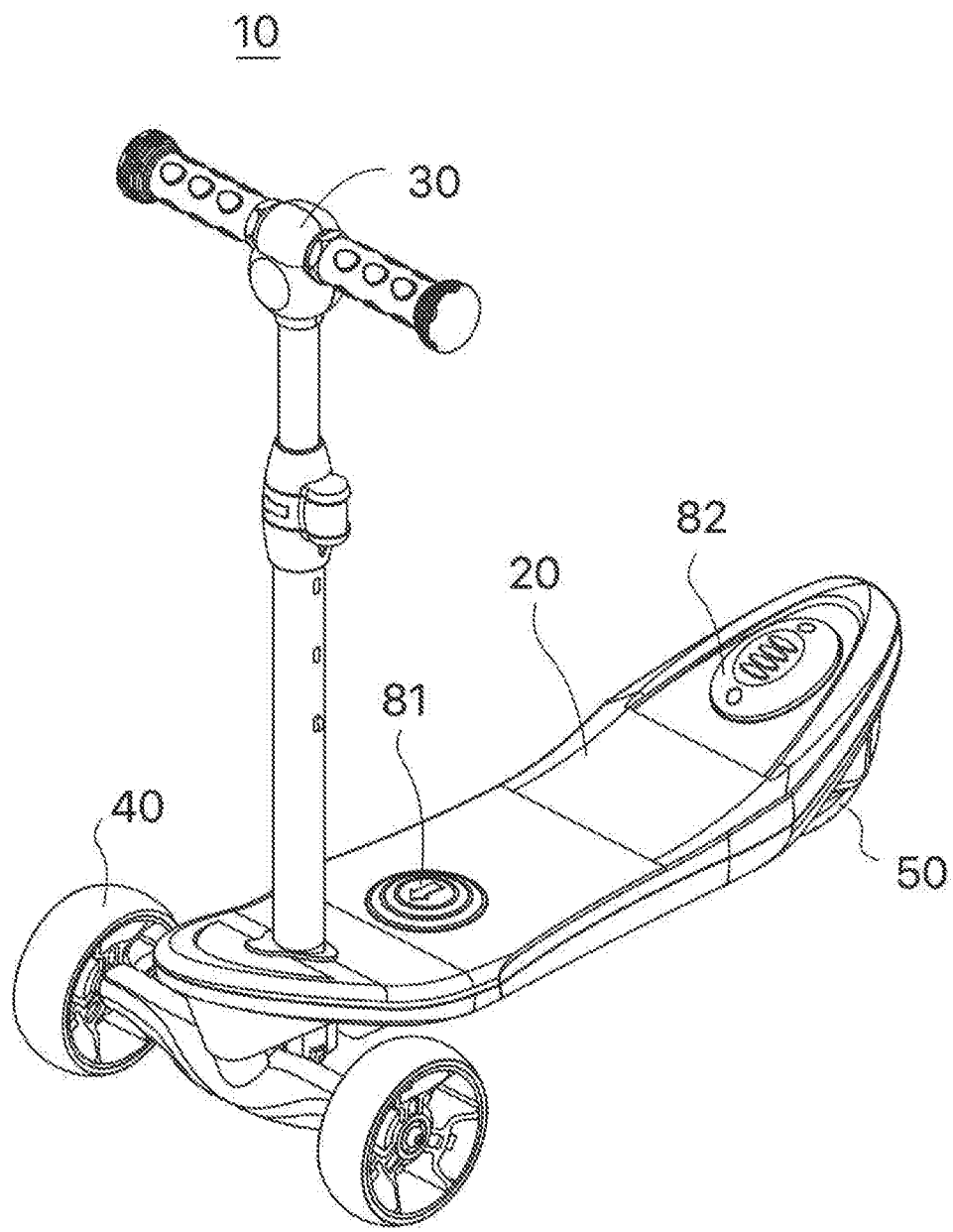
FIG. 1 is a schematic view of a dual-purpose electric scooter according to an embodiment of the present disclosure in a foot-driving mode.
Figure 2:
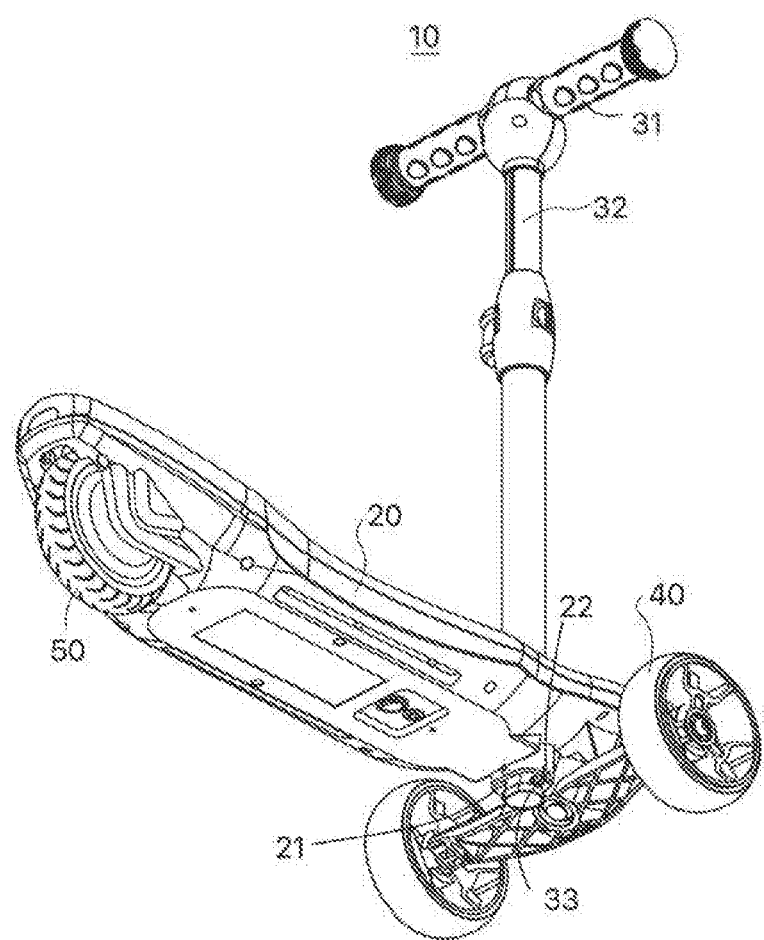
FIG. 2 is another schematic view of the dual-purpose electric scooter of FIG. 1.
Figure 3:
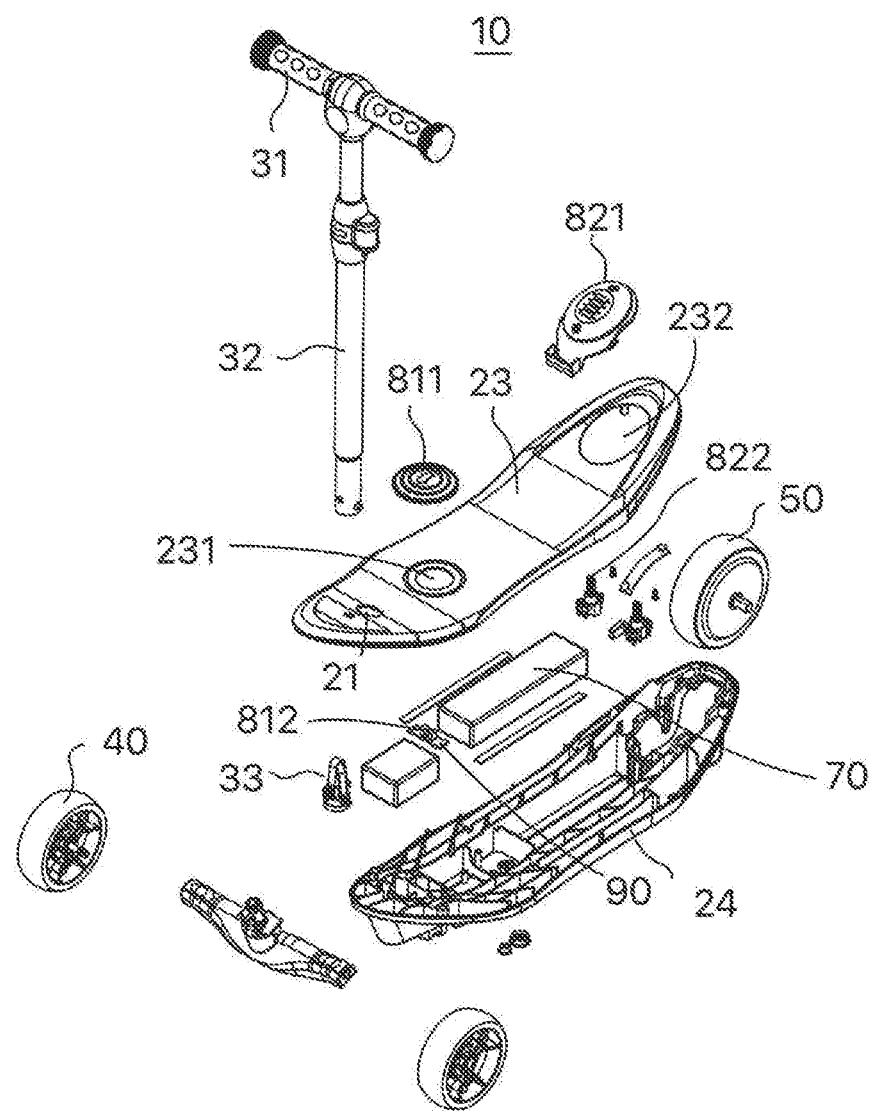
FIG. 3 is an exposed view of the dual-purpose electric scooter of FIG. 1.
Figure 4:
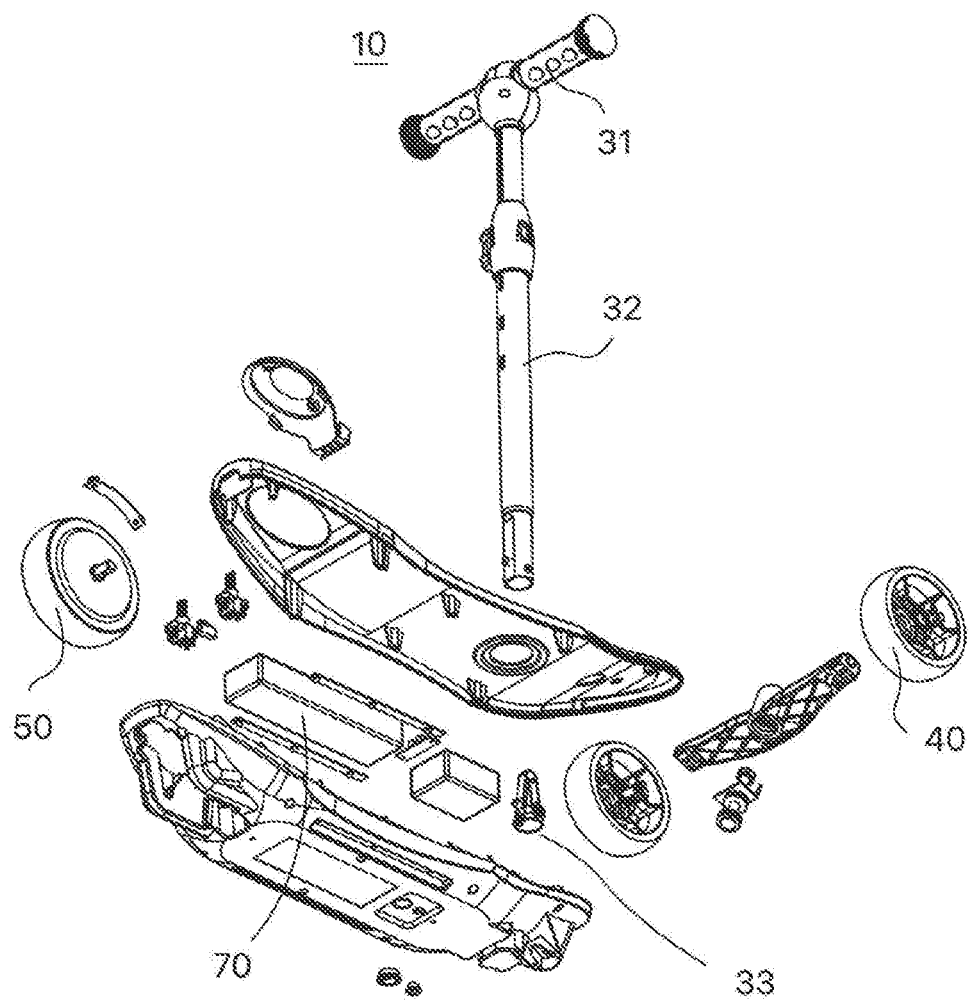
FIG. 4 is another exposed view of the dual-purpose electric scooter of FIG. 1.
Figure 5:
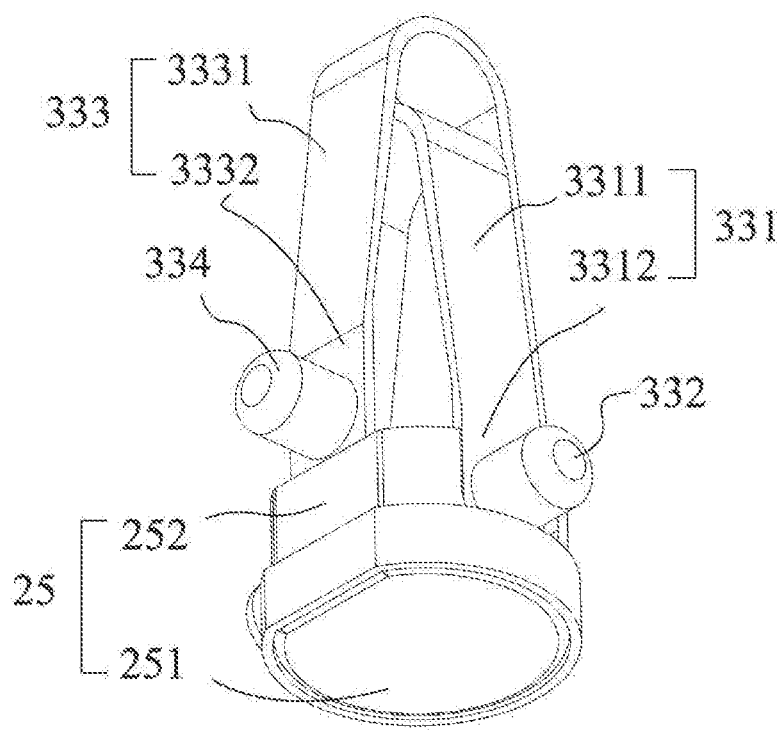
FIG. 5 is a schematic view of a second fastener of the handlebar assembly of the scooter of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Referring to FIG. 1 to FIG. 5, a dual-purpose electric scooter 10 includes a deck assembly 20, a handlebar assembly 30 detachably connected with the deck assembly 20, two front wheels 40 installed on a bottom side of the deck assembly 20; and a back wheel 50 installed on the bottom side of the deck assembly 20. The back wheel 50 is a motor integrated wheel and configured to drive the electric scooter 10 move in an electric mode. The motor integrated wheel includes a wheel and a motor inside within the wheel, and when the motor is provides a driving signal, it can rotate to drive the electric scooter 10 move.

The deck assembly 20 includes a first mounting portion 21 and a first fastener 22 located at a side wall 211 of the first mounting portion 21. The first mounting portion 21 includes a groove. The handlebar assembly 30 includes a handle 31, an upright rod 32 and second fastener 33. An end of the upright rod 32 is connected with the handle 31. The second fastener 33 is disposed at the other end of the upright rod 32.

When the other end of the upright rod 32 is disposed in the first mounting portion 21 and the first fastener 22 is fixed with the second fastener 33, the handlebar assembly 30 is connected with the deck assembly 20. Thus, a user can hold a handlebar assembly 30 of the scooter 10 and ride the scooter 10 in a foot-driving mode.

When the first fastener 22 and the second fastener 33 separate from each other, the other end of the upright rod 32 is able to be separated from the deck assembly 20. Thus, the user can ride the scooter 10 in an electric mode.

In the embodiment, the first fastener 22 is a first notch located at the side wall of the first mounting portion 21. The second fastener 33 includes a first elastic portion 331 located in the other end of the upright rod 32 and a first protrusion 332 connected with the first elastic portion 331. When the first protrusion 332 is pressed by a first external force, the first elastic portion 331 is compressed to pull the first protrusion 332 into the upright rod 32 and separate from the first notch of the first mounting portion 21. When the first external force is removed, a first elastic force released by the first elastic portion 331 drives the first protrusion 332 protrude from the upright rod 32 so as to fix into the first notch of the first mounting portion 21.

Further, the second fastener 33 a second elastic portion 333 located in the other end of the upright rod 32 and a second protrusion 334 connected with the second elastic portion 333, the second protrusion 334 is configured to abuts against the side wall of the first mounting portion 21.

The first elastic portion 331 includes a first V-shaped structure 3311 and a first extending part 3312 connected with an end of the first V-shaped structure 3311. The first protrusion 332 is disposed on the first extending part 3312. The second elastic portion 333 includes a second V-shaped structure 3331 and a second extending part 3332 connected with an end of the second V-shaped structure 3331. A first opening of the first V-shaped structure 3311 and a second opening of the second V-shaped structure 3331 are towards to a bottom side of the deck assembly 20. The second V-shaped structure 3331 is located at an upper side of the first V-shaped structure 3311 and abuts the first V-shaped structure 3311, and the second protrusion 334 is disposed on the second extending part 3332.

The handlebar assembly 20 includes a fixing cover 25 located at a bottom side of the second fastener 33 and fixed on the other end of the upright rod 32. The fixing cover 25 includes a cover body 251 and a side plate 252 connected with the cover body 251. The side plate 252 abuts an outer surface of the other end of the upright rod 32 and includes a second notch, and the first protrusion 332 passes through the second notch of the side plate 252.

Figure 6:
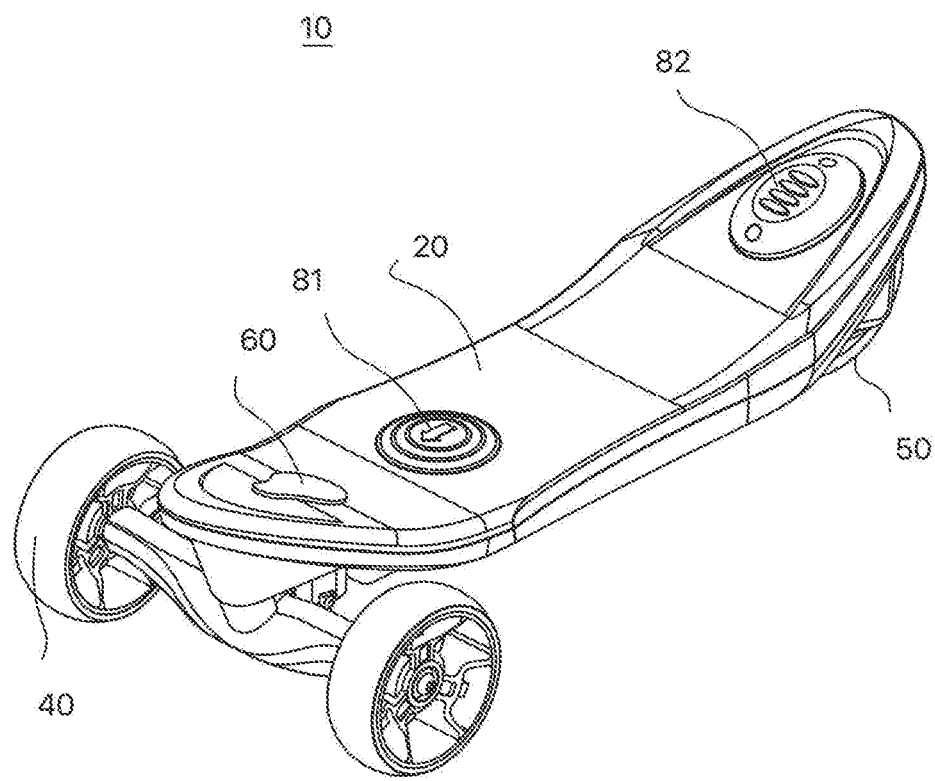
FIG. 6 is a schematic view of the dual-purpose electric scooter of FIG. 1 in an electric mode.

Referring to FIG. 6, the dual-purpose electric scooter 10 further includes a cover plate 60, and the cover plate 60 is configured to detachably connect with the deck assembly 20 and cover the first mounting portion 21 when the handlebar assembly 30 separate from the deck assembly 20.

The deck assembly 20 further includes an upper shell 23 and an bottom shell 24 connected with the upper shell 23. The dual-purpose electric scooter 10 further a battery 70 located between the upper shell 23 and the bottom shell 24 and supplies the back wheel 50.

Figure 7:
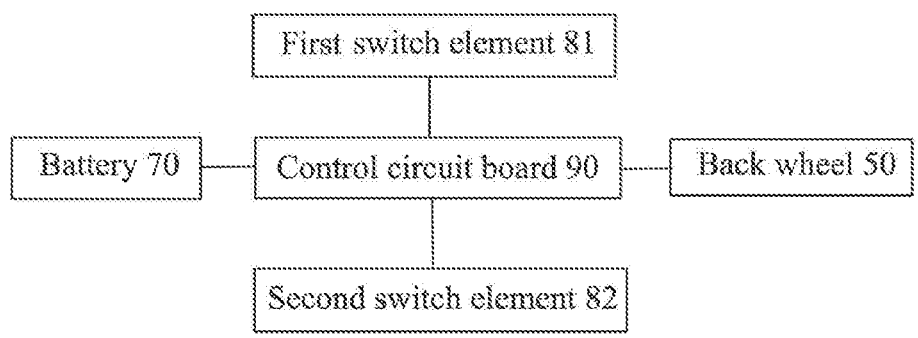
FIG. 7 is a circuit block diagram of the dual-purpose electric scooter of FIG. 1.

Referring to FIG. 7, the dual-purpose electric scooter 10 further includes a first switch element 81 and a control circuit board 90. The control circuit board 90 is electrically connected with the first switch element 81, the battery 70 and the motor integrated wheel (the back wheel 50). The first switch element 81 includes a first pedal 811 mounted on the upper shell 23 and a first trigger portion 812 disposed on the control circuit board 90. When the first pedal 811 is stamped by a foot, the first trigger portion 812 is triggered and generates a first switch signal, and the control circuit board 90 controls the motor integrated wheel (the back wheel 50) rotate according to the first switch signal.

Further, the upper shell 23 includes a second mounting portion 231 located at a back side of the handlebar assembly 30 and adjacent to the handlebar assembly 30, the first pedal 811 is installed in the second mounting portion 231. The second mounting portion 231 may include a mounting hole.

The dual-purpose electric scooter 10 further a second switch element 82 electrically connected with the control circuit board 90. The second switch element 82 includes a second pedal 821 mounted on the upper shell 23 and a brake element 822 electrically connected with the control circuit board 90. When the second pedal 821 is stamped by a foot, the brake element 822 is triggered and generates a second switch signal, and the control circuit board 90 controls the motor integrated wheel (the back wheel 50) stop rotating according to the second switch signal.

Further, the upper shell 23 includes a third mounting portion 232 located at the an end far away from the handlebar assembly 30 and adjacent to the back wheel 50, the second pedal 821 is installed in the third mounting portion 232. The third mounting portion 232 may include a mounting hole.

The present disclosure has the beneficial effects: when the other end of the upright rod 32 is disposed in the first mounting portion 21 and the first fastener 22 is fixed with the second fastener 33, the handlebar assembly 30 is connected with the deck assembly 20, and a user can hold the handlebar assembly 30 of the scooter 10 and ride the scooter 10 in a foot-driving mode. When the first fastener 22 and the second fastener 33 separate from each other, the other end of the upright rod 32 is able to be separated from the deck assembly 20, and the user can ride the scooter 10 in an electric mode. The scooter 10 can be ridden in the two modes and the user can get good user experience.

The above description only describes embodiments of the present disclosure, and is not intended to limit the present disclosure, various modifications and changes can be made to the present disclosure. Any modifications, equivalent substitutions, improvements, etc. made within the spirit and scope of the present disclosure are intended to be included within the scope of the present disclosure.

What is claimed is:

1. A dual-purpose electric scooter, comprising
a deck assembly;

a handlebar assembly detachably connected with the deck assembly;

two front wheels installed on a bottom side of the deck assembly; and a back wheel installed on the bottom side of the deck assembly, and the back wheel being a motor integrated wheel and configured to drive the electric scooter move, wherein the deck assembly comprises a first mounting portion and a first fastener located at a side wall of the first mounting portion, the handlebar assembly comprises a handle, an upright rod and second fastener, an end of the upright rod is connected with the handle, the second fastener is disposed at the other end of the upright rod, when the other end of the upright rod is disposed in the first mounting portion and the first fastener is fixed with the second fastener, the handlebar assembly is connected with the deck assembly, when the first fastener and the second fastener separate from each other, the other end of the upright rod is able to be separated from the deck assembly.

2. The dual-purpose electric scooter according to claim 1, wherein the first fastener is a first notch located at the side wall of the first mounting portion, the second fastener comprises a first elastic portion located in the other end of the upright rod and a first protrusion connected with the first elastic portion, when the first protrusion is pressed by a first external force, the first elastic portion is compressed to pull the first protrusion into the upright rod and separate from the first notch, when the first external force is removed, a first elastic force released by the first elastic portion drives the first protrusion protrude from the upright rod so as to fix into the first notch.

3. The dual-purpose electric scooter according to claim 2, wherein the second fastener comprises a second elastic portion located in the other end of the upright rod and a second protrusion connected with the second elastic portion, the second protrusion is configured to abuts against the side wall of the first mounting portion.

4. The dual-purpose electric scooter according to claim 3, wherein the first elastic portion comprises a first V-shaped structure and a first extending part connected with an end of the first V-shaped structure, the first protrusion is disposed on the first extending part, the second elastic portion comprises a second V-shaped structure and a second extending part connected with an end of the second V-shaped structure, a first opening of the first V-shaped structure and a second opening of the second V-shaped structure are towards to a bottom side of the deck assembly, the second V-shaped structure is located at an upper side of the first V-shaped structure and abuts the first V-shaped structure, the second protrusion is disposed on the second extending part.

5. The dual-purpose electric scooter according to claim 3, wherein the handlebar assembly comprises a fixing cover located at a bottom side of the second fastener and fixed on the other end of the upright rod, the fixing cover comprises a cover body and a side plate connected with the cover body, the side plate abuts an outer surface of the other end of the upright rod and comprises a second notch, and the first protrusion passes through the second notch.

6. The dual-purpose electric scooter according to claim 1, wherein the dual-purpose electric scooter comprises a cover plate configured to detachably connect with the deck assembly and cover the first mounting portion when the handlebar assembly separate from the deck assembly.

7. The dual-purpose electric scooter according to claim 1, wherein the deck assembly comprises an upper shell and an bottom shell connected with the upper shell, the dual-purpose electric scooter comprises a battery located between the upper shell and the bottom shell and supplies the motor integrated wheel.

8. The dual-purpose electric scooter according to claim 7, wherein the dual-purpose electric scooter comprises a first switch element and a control circuit board, the control circuit board is electrically connected with the first switch element, the battery and the motor integrated wheel, the first switch element comprises a first pedal mounted on the upper shell and a first trigger portion disposed on the control circuit board, when the first pedal is stamped by a foot, the first trigger portion is triggered and generates a first switch signal, and the control circuit board controls the motor integrated wheel rotate according to the first switch signal.

9. The dual-purpose electric scooter according to claim 8, wherein the upper shell comprises a second mounting portion located at a back side of the handlebar assembly and adjacent to the handlebar assembly, the first pedal is installed in the second mounting portion.

10. The dual-purpose electric scooter according to claim 7, wherein the dual-purpose electric scooter comprises a second switch element electrically connected with the control circuit board, the second switch element comprises a second pedal mounted on the upper shell and a brake element electrically connected with the control circuit board, when the second pedal is stamped by a foot, the brake element is triggered and generates a second switch signal, and the control circuit board controls the motor integrated wheel stop rotating according to the second switch signal.

11. The dual-purpose electric scooter according to claim 10, wherein the upper shell comprises a third mounting portion located at the an end far away from the handlebar assembly and adjacent to the back wheel, the second pedal is installed in the third mounting portion.

12. A dual-purpose electric scooter, comprising
a deck assembly;
a handlebar assembly detachably connected with the deck assembly; and
at least three wheels installed on a bottom side of the deck assembly, one of the at least two wheels being a motor integrated wheel and configured to drive the electric scooter move, wherein the deck assembly comprises an upper shell and an bottom shell connected with the upper shell, the dual-purpose electric scooter comprises a battery located between the upper shell and the bottom shell and supplies the motor integrated wheel, the dual-purpose electric scooter comprises a first switch element and a control circuit board, the control circuit board is electrically connected with the first switch element, the battery and the motor integrated wheel, the first switch element comprises a first pedal mounted on the upper shell and a first trigger portion disposed on the control circuit board, when the first pedal is stamped by a foot, the first trigger portion is triggered and generates a first switch signal, and the control circuit board controls the motor integrated wheel rotate according to the first switch signal.

13. The dual-purpose electric scooter according to claim 12, wherein the deck assembly comprises a first mounting portion and a first fastener located at a side wall of the first mounting portion, the handlebar assembly comprises a handle, an upright rod and second fastener, an end of the upright rod is connected with the handle, the second fastener is disposed at the other end of the upright rod, when the other end of the upright rod is disposed in the first mounting portion and the first fastener is fixed with the second fastener, the handlebar assembly is connected with the deck assembly, when the first fastener and the second fastener separate from each other, the other end of the upright rod is able to be separated from the deck assembly.

14. The dual-purpose electric scooter according to claim 13, wherein the first fastener is a first notch located at the side wall of the first mounting portion, the second fastener comprises a first elastic portion located in the other end of the upright rod and a first protrusion connected with the first elastic portion, when the first protrusion is pressed by a first external force, the first elastic portion is compressed to pull the first protrusion into the upright rod and separate from the first notch, when the first external force is removed, a first elastic force released by the first elastic portion drives the first protrusion protrude from the upright rod so as to fix into the first notch.

15. The dual-purpose electric scooter according to claim 14, wherein the second fastener comprises a second elastic portion located in the other end of the upright rod and a second protrusion connected with the second elastic portion, the second protrusion is configured to abuts against the side wall of the first mounting portion.

16. The dual-purpose electric scooter according to claim 15, wherein the first elastic portion comprises a first V-shaped structure and a first extending part connected with an end of the first V-shaped structure, the first protrusion is disposed on the first extending part, the second elastic portion comprises a second V-shaped structure and a second extending part connected with an end of the second V-shaped structure, a first opening of the first V-shaped structure and a second opening of the second V-shaped structure are towards to a bottom side of the deck assembly, the second V-shaped structure is located at an upper side of the first V-shaped structure and abuts the first V-shaped structure, the second protrusion is disposed on the second extending part, the handlebar assembly comprises a fixing cover located at a bottom side of the second fastener and fixed on the other end of the upright rod, the fixing cover comprises a cover body and a side plate connected with the cover body, the side plate abuts an outer surface of the other end of the upright rod and comprises a second notch, and the first protrusion passes through the second notch.

17. The dual-purpose electric scooter according to claim 12, wherein the dual-purpose electric scooter comprises a cover plate configured to detachably connect with the deck assembly and cover the first mounting portion when the handlebar assembly separate from the deck assembly.

18. The dual-purpose electric scooter according to claim 10, wherein the dual-purpose electric scooter comprises a second switch element electrically connected with the control circuit board, the second switch element comprises a second pedal mounted on the upper shell and a brake element electrically connected with the control circuit board, when the second pedal is stamped by a foot, the brake element is triggered and generates a second switch signal, and the control circuit board controls the motor integrated wheel stop rotating according to the second switch signal.

19. A dual-purpose electric scooter, comprising
a deck assembly;
a handlebar assembly detachably connected with the deck assembly; and
at least three wheels installed on a bottom side of the deck assembly, one of the at least two wheels being a motor integrated wheel and configured to drive the electric scooter move,
wherein the dual-purpose electric scooter comprises a cover plate configured to detachably connect with the deck assembly and cover the first mounting portion when the handlebar assembly separate from the deck assembly.

\* \* \* \* \*